United States Patent
Evans et al.

(10) Patent No.: US 8,262,099 B2
(45) Date of Patent: Sep. 11, 2012

(54) APPARATUS FOR ADAPTING A WORKPIECE HOLDING DEVICE TO A MACHINE TOOL

(75) Inventors: Thomas C. Evans, Arlington, TX (US); Willis A. Rowcliffe, Sherman, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 1184 days.

(21) Appl. No.: 11/498,285

(22) Filed: Aug. 2, 2006

(65) Prior Publication Data

US 2008/0029978 A1 Feb. 7, 2008

(51) Int. Cl.
*B23B 31/16* (2006.01)

(52) U.S. Cl. .............................. 279/143; 279/99; 82/165

(58) Field of Classification Search .............. 279/8, 99, 279/143, 145; 82/162, 165, 168; *B23B 31/16*
See application file for complete search history.

(56) References Cited

U.S. PATENT DOCUMENTS

| | | | | |
|---|---|---|---|---|
| 2,415,590 A * | 2/1947 | Hendrickson et al. | .......... | 82/142 |
| 4,269,553 A * | 5/1981 | Drazy | .......................... | 409/232 |
| 4,550,922 A * | 11/1985 | Hall et al. | ..................... | 279/119 |
| 4,647,051 A * | 3/1987 | Stone et al. | .................. | 279/2.04 |
| 4,688,810 A * | 8/1987 | Waite | .............. | 279/143 |
| 4,939,966 A * | 7/1990 | Grund et al. | .................... | 82/165 |
| 5,193,826 A * | 3/1993 | Smith | .......................... | 279/145 |
| 5,325,749 A * | 7/1994 | Peris et al. | ...................... | 82/142 |
| 5,615,590 A * | 4/1997 | Speckhahn | ..................... | 82/162 |
| 5,667,228 A * | 9/1997 | Fabris | ........................ | 279/143 |
| 5,901,967 A * | 5/1999 | Morisaki | ..................... | 279/4.12 |
| 6,367,814 B1 * | 4/2002 | Luscher et al. | .............. | 279/2.09 |
| 7,108,465 B2 * | 9/2006 | Kunii | ............................ | 409/219 |
| 2001/0005068 A1 * | 6/2001 | Gifford et al. | .................. | 279/75 |
| 2005/0073116 A1 * | 4/2005 | Kunii | ............................. | 279/143 |

* cited by examiner

*Primary Examiner* — Eric A Gates
(74) *Attorney, Agent, or Firm* — Slater & Matsil, L.L.P.

(57) ABSTRACT

An apparatus for adapting a workpiece holding device to a chuck of a machine tool includes a plurality of chuck locators configured for attachment to the chuck, such that the plurality of chuck locators includes at least three chuck locators. The apparatus further includes a mounting plate configured for attachment to the workpiece holding device. The mounting plate includes a body and a plurality of mounting plate locators corresponding to the plurality of chuck locators, such that the plurality of mounting plate locators are attached to the body and are configured to interface with the plurality of chuck locators.

20 Claims, 5 Drawing Sheets

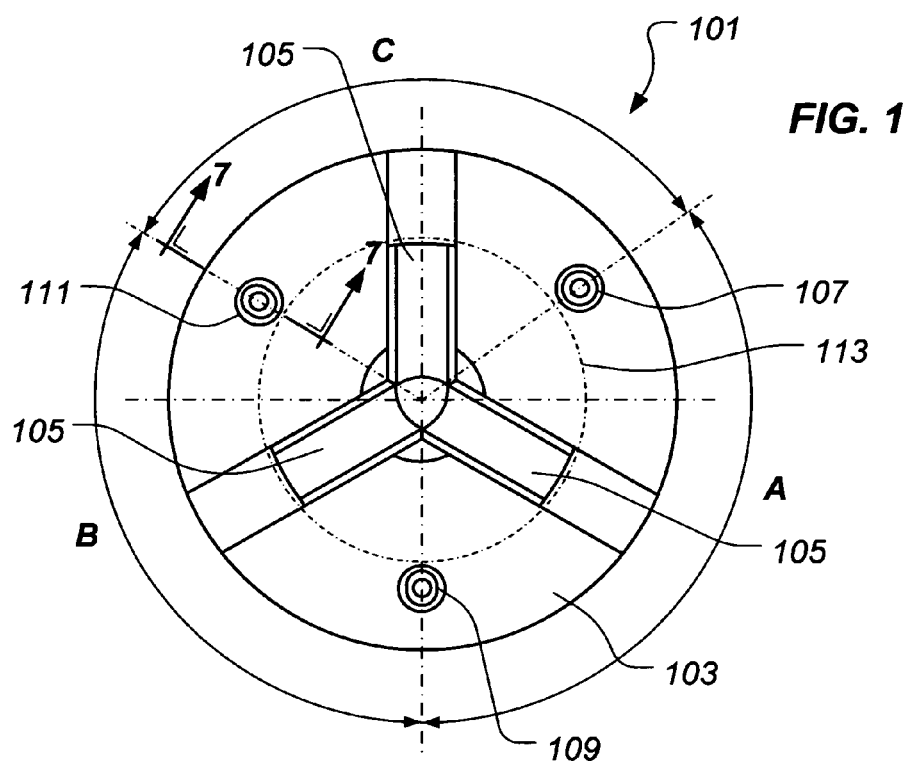
FIG. 1
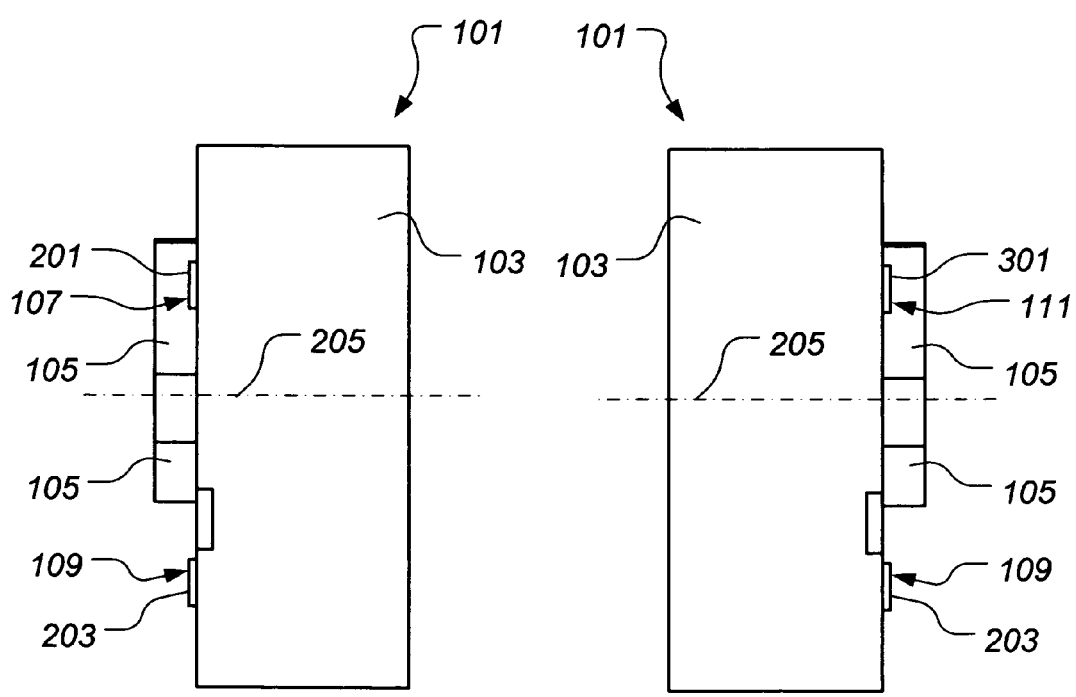
FIG. 2  FIG. 3

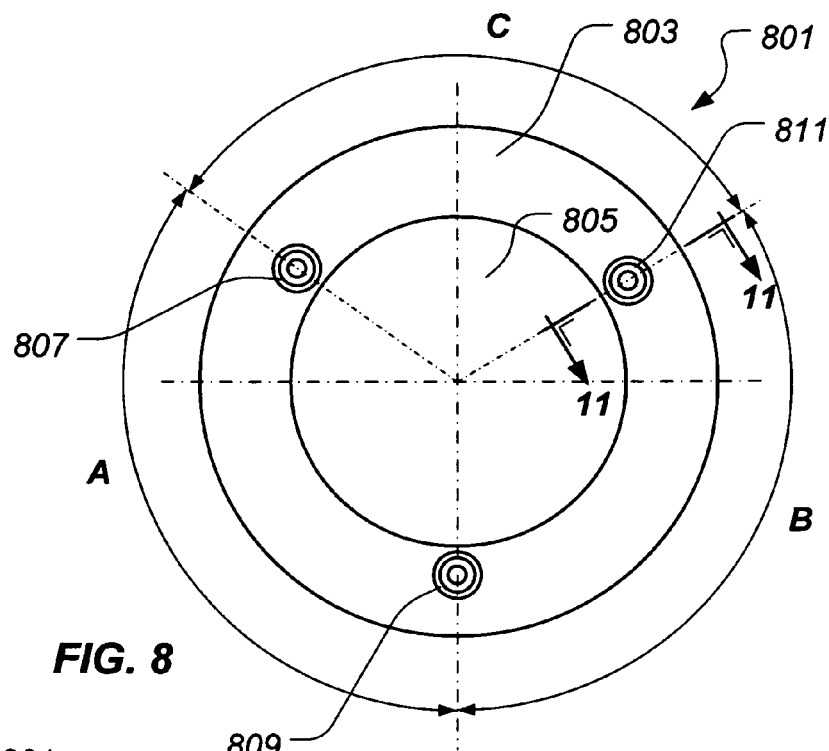
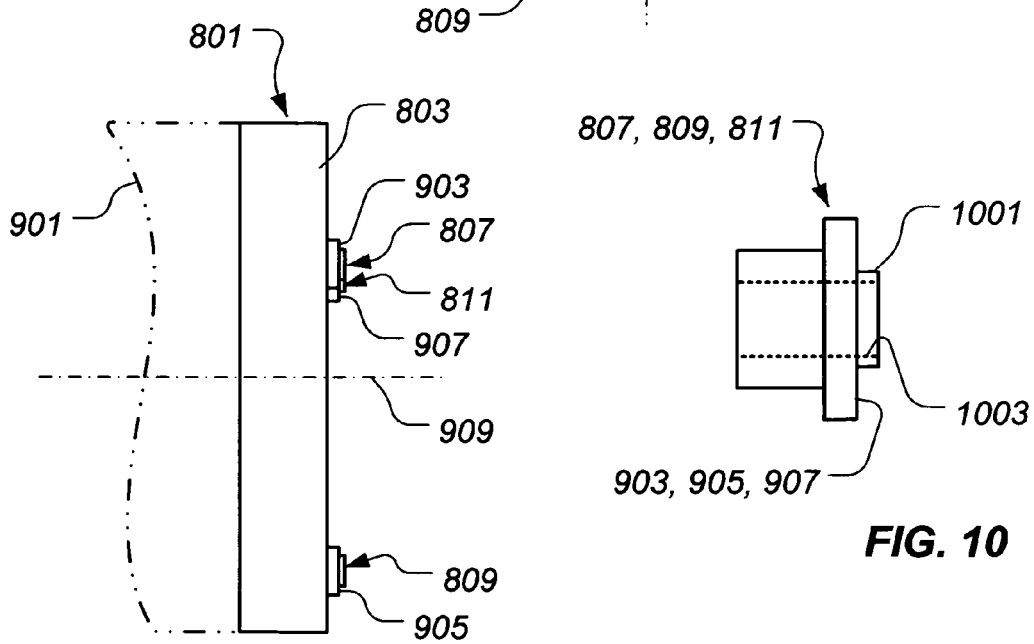
FIG. 8
FIG. 9
FIG. 10

APPARATUS FOR ADAPTING A WORKPIECE HOLDING DEVICE TO A MACHINE TOOL

BACKGROUND

1. Field of the Invention

The present invention relates to workpiece holding devices for machine tools.

2. Description of Related Art

Machine tools, such as lathes, turning centers, milling/turning centers, and the like, are used to remove material from a workpiece. A chuck is often used in such a machine tool to hold the workpiece while the machining operation is being conducted. Generally, a chuck is a workpiece clamp that is operably associated with the machine tool. In most implementations, the chuck is attached to a rotatable spindle of the machine tool. Thus, in such an implementation, the machine tool's spindle rotates the workpiece via the chuck.

Chucks comprise moveable dogs or jaws that engage and hold the workpiece in a fixed relationship to the chuck. Three-jaw chucks are particularly well-suited for holding generally cylindrical parts. Three-jaw chucks typically include jaws that move in unison. In other words, all three jaws are commonly actuated to hold a workpiece or to release a workpiece. Four-jaw chucks typically include jaws that move independently of one another. In other words, each jaw is independently actuated to hold a workpiece or to release a workpiece. Four-jaw chucks are particularly well-suited for holding workpieces that are not generally cylindrical, such as workpieces that are asymmetrical in cross-section. Chucks also exist that have more than four jaws. Such chucks typically include jaws that move independently of one another.

Some workpieces cannot be effectively held by a chuck during machining operations. Many factors are considered when determining whether a particular workpiece can be held by a chuck, such as workpiece complexity, material thickness, dimensional tolerances of the finished part, and the like. Specialized workpiece holding devices are often used to hold workpieces that cannot effectively be held by a chuck. In order to use such specialized workpiece holding devices, however, the chuck must be removed from the machine tool and replaced, generally, with a face plate. The specialized tooling can then be mounted to the face plate.

Removing the chuck and mounting the face plate adds to the time required to setup the machining operation, thus increasing the cost of machining the workpiece. In a machine tool that uses a manually-operated chuck, the chuck is detached from the machine tool's spindle as the chuck is being supported. Once detached from the spindle, the chuck is moved, sometimes with a hoist or the like, to a storage area. The face plate is then picked up from a storage area and moved to the machine tool. If the face plate is heavy, a hoist or the like is used. The face plate is then attached to the spindle. It should be noted that a machine tool produces revenue for the machine tool's owner only when a part is being machined, not during set up operations.

Some machine tools use automated chucks, such as hydraulically-operated chucks. The effort required to remove such a chuck and mount the face plate is increased, and may be dramatically increased, over manually-operated chucks. For example, hydraulic or other such power-providing lines must be removed and possibly drained prior to removing an automated chuck from a machine tool. Moreover, in a hydraulically-operated chuck, if hydraulic fluid is spilled during removal of the hydraulic lines, the spill must be removed to avoid a safety hazard. After the power-providing lines are removed, the chuck is removed and replaced with a face plate, as described above concerning manually-operated chucks.

There are many designs of machine tools and workpiece holding devices well known in the art; however, considerable shortcomings remain.

SUMMARY OF THE INVENTION

There is a need for an apparatus for adapting a workpiece holding device to a chuck of a machine tool.

Therefore, it is an object of the present invention to provide an apparatus for adapting a workpiece holding device to a chuck of a machine tool.

This and other objects are achieved by providing an apparatus for adapting a workpiece holding device to a chuck of a machine tool. The apparatus includes a plurality of chuck locators configured for attachment to the chuck, such that the plurality of chuck locators includes at least three chuck locators. The apparatus further includes a mounting plate configured for attachment to the workpiece holding device. The mounting plate includes a body and a plurality of mounting plate locators corresponding to the plurality of chuck locators, such that the plurality of mounting plate locators are attached to the body and are configured to interface with the plurality of chuck locators.

In another aspect, the present invention provides an apparatus for adapting a workpiece holding device to a machine tool. The apparatus includes a chuck; a plurality of chuck locators attached to the chuck, such that the plurality of chuck locators includes at least three chuck locators; and a mounting plate configured for attachment to the workpiece holding device. The mounting plate includes a body and a plurality of mounting plate locators corresponding to the plurality of chuck locators, such that the plurality of mounting plate locators are attached to the body and are configured to interface with the plurality of chuck locators.

In yet another aspect of the present invention, an apparatus for adapting a workpiece holding device to a machine tool is provided. The apparatus includes a chuck defining a plurality of bores of no less than three bores and a plurality of fastener openings, such that one of the plurality of fastener openings extends from each of the plurality of bores. The apparatus further includes a chuck locator attached to the chuck in each of the plurality of bores defined by the chuck, each of the chuck locators defining a faying surface and fastener opening. The apparatus further includes a mounting plate configured for attachment to the workpiece holding device. The mounting plate includes a body defining a plurality of bores corresponding to the plurality of bores defined by the chuck and a plurality of fastener openings, such that one of the plurality of fastener openings extends from each of the plurality of bores defined by the body. The mounting plate further includes a mounting plate locator attached to the mounting plate in each of the plurality of bores defined by the body of the mounting plate, each of the mounting plate locators defining a faying surface abutting one of the faying surfaces of the chuck locators and a fastener opening, such that the mounting plate is spaced away from the chuck by the chuck locators and the mounting plate locators. The apparatus further includes a plurality of fasteners corresponding to the plurality of fastener openings of defined by the chuck, the plurality of fasteners extending through the plurality of fastener openings defined by the body of the mounting plate, extending through the fastener openings defined by the mounting plate locators, extending through the fastener openings defined by the chuck locators, and extending into the plurality of fastener openings defined by the chuck, such that the fasteners are engaged with the chuck.

The present invention provides significant advantages, including: (1) providing a means for attaching a workpiece holding device to a machine tool without removing a chuck of the machine tool; (2) providing a means for attaching a workpiece holding device to a machine tool without removing power-providing lines to an automatic chuck; and (3) providing a means for adapting a chuck present on a machine tool to receive a workpiece holding device.

Additional objectives, features and advantages will be apparent in the written description which follows.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIG. 1 is a front, elevational view of an illustrative embodiment of a chuck according to the present invention;

FIGS. 2 and 3 are side, elevational views of the chuck embodiment of FIG. 1;

FIG. 8 is a rear, elevational view of an illustrative embodiment of a mounting plate configured to mate with the chuck of FIG. 1, according to the present invention;

FIG. 9 is a side, elevational view of the mounting plate of FIG. 8;

FIG. 10 is a side, elevational view of a locator of the mounting plate of FIG. 8, according to the present invention;

Figure 4:
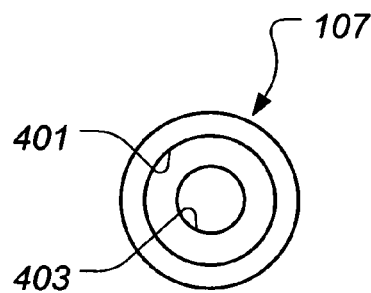
FIGS. 4-6 are enlarged, front, elevational views of illustrative embodiments of locators of the chuck of FIG. 1, according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention represents an apparatus for adapting a workpiece holding device to a machine tool. The apparatus employs a three-point technique for aligning the workpiece holding device to a chuck of the machine tool. The apparatus comprises at least three locators fixedly attached to the chuck and a mounting plate having a corresponding at least three locators. The workpiece holding device, which may exhibit any suitable, desired configuration, is fixedly attached to the mounting plate.

FIG. 1 depicts an illustrative embodiment of a machine tool chuck 101 according to the present invention. Chuck 101 comprises a body 103 and a plurality of jaws 105 operably associated with body 103. It should be noted that in the illustrated embodiment chuck 101 comprises three jaws 105. The scope of the present invention, however, is not so limited. Rather, chuck 101 may comprise any suitable number of jaws, such as jaws 105. For example, chuck 101 may comprise four or more jaws. Moreover, chuck 101 may be a "self-centering" chuck, such that all three jaws 105 move in unison, or chuck 101 may be an "independent" chuck, such that jaws 105 can be moved independently of one another.

Referring now to FIGS. 1-3, chuck 101 further comprises a first chuck locator 107, a second chuck locator 109, and a third chuck locator 111, which are fixedly attached to body 103 of chuck 101. First chuck locator 107, second chuck locator 109, and third chuck locator 111 are used, via a mounting plate that will be described in greater detail herein, to position a workpiece holding device in proper relationship to chuck 101. In the illustrated embodiment, first chuck locator 107, second chuck locator 109, and third chuck locator 111 define faying surfaces 201, 203, and 301, respectively. Faying surfaces 201, 203, and 301 exhibit a predetermined relationship to a rotational axis 205 of chuck 101. Preferably, faying surfaces 201, 203, and 301 are substantially coplanar with one another and are substantially perpendicular to rotational axis 205.

Referring again to the embodiment of FIG. 1, chuck locators 107, 109, and 111 are fixedly attached to body 103 in a predetermined relationship to rotational axis 205, as noted above. Preferably, chuck locators 107, 109, and 111 are disposed outboard (i.e., away from rotational axis 205) of a minimum jaw diameter represented by circle 113. The minimum jaw diameter is the smallest diameter circle (e.g., circle 113) that can circumscribe jaws 105. In other words, in the illustrated embodiment, circle 113 circumscribes jaws 105 when jaws 105 abut one another or substantially abut one another. This preferred configuration allows a mounting plate to be mounted to chuck 101 to have a simple, cylindrical recess to accommodate jaws 105, as will be discussed in greater detail herein. It should be noted, however, that chuck locators 107, 109, and 111 may have other spatial relationships with respect to rotational axis 205 (shown in FIG. 2), body 103, and/or jaws 105. For example, the scope of the present invention encompasses an embodiment wherein each of chuck locators 107, 109, and 111 are each spaced away from rotational axis 205 by different distances. Moreover, the scope of the present invention encompasses an embodiment wherein one or more of chuck locators 107, 109, and 111 are disposed within circle 113, which, as noted above, represents the minimum jaw diameter.

Still referring to FIG. 1, first chuck locator 107 is angularly spaced from second chuck locator 109 by an angle A. Second chuck locator 109 is angularly spaced from third chuck locator 111 by an angle B. Third chuck locator 111 is angularly spaced from first chuck locator 107 by an angle C. Preferably, angles A, B, and C are different values, so that a workpiece holding device can be mounted to chuck 101 in only one rotational orientation about rotational axis 205. In other embodiments, however, chuck locators 107, 109, and 111 may be attached to body 103 at any suitable, predetermined locations.

Figure 5:
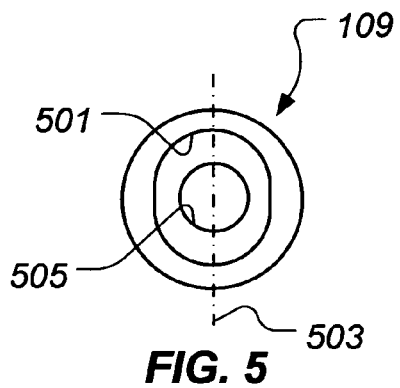
Figure 6:
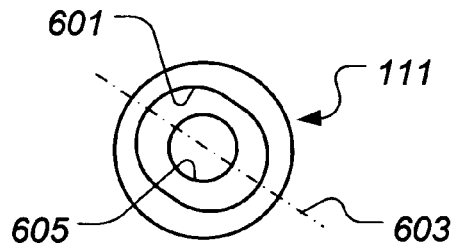

FIGS. 4-6 depict enlarged views of preferred embodiments of chuck locators 107, 109, and 111, respectively. In this embodiment, chuck locators 107, 109, and 111 are headed bushings made from hardened steel, carbide, or the like. First chuck locator 107 defines a substantially right circular cylindrical bore 401, while second chuck locator 109 and third chuck locator 111 define oblong cylindrical bores 501 and 601, respectively. Bore 401 serves as an origin for spatially locating a workpiece holding device on chuck 101 (shown in FIGS. 1-3). Bores 501 and 601 allow for manufacturing tolerances in the positions of chuck locators 107, 109, and 111 on body 103, as well as for manufacturing tolerances in the positions of corresponding locators of the workpiece holding device to be mounted to chuck 101, as will be discussed in greater detail herein. Preferably, longitudinal axes 503 and 603 of chuck locators 109 and 111, respectively, intersect rotational axis 205 (shown in FIG. 2).

Figure 7:
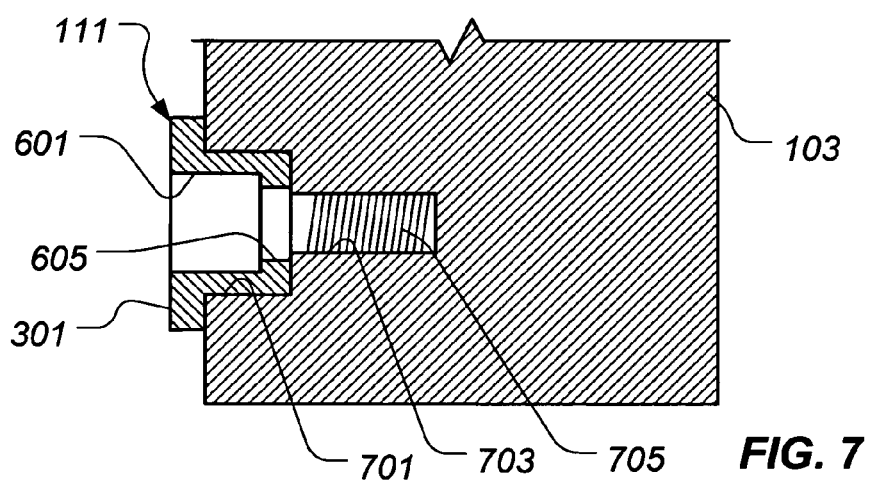
FIG. 7 is a cross-sectional view of a portion of the chuck of FIG. 1, taken along the line 7-7 in FIG. 1.

FIG. 7 depicts a cross-sectional view, taken along the line 7-7 in FIG. 1, of a portion of chuck 101 including third chuck locator 111. Third chuck locator 111 is disposed in a bore 701 defined by body 103 of chuck 101. Preferably, third chuck locator 111 is engaged with body 103 by a press-fit. Alternatively, third chuck locator 111 may be attached to body 103 within bore 701 by any suitable means, such as by adhesive bonding. First chuck locator 107 and second chuck locator 109 are also disposed in bores, corresponding to bore 701, defined by body 103 in a similar manner as third chuck locator 111.

Still referring to FIG. 7, body 103 further defines a fastener opening 703 to accept a fastener. Preferably, body 103 includes threads 705 defining at least part of fastener opening 703. Body 103 also defines fastener openings, corresponding to fastener opening 703, that are adjacent to bores in which chuck locators 107 and 109 are disposed. Referring also to FIGS. 4-6, chuck locators 107, 109, and 111 further define fastener openings 403, 505, and 605, respectively, through which fasteners may be disposed for engagement with the fastener openings, such as fastener opening 703, defined by body 103.

FIGS. 8 and 9 depict a mounting plate 801 for mounting any suitable workpiece holding device 901 (shown in phantom in FIG. 9) to chuck 101 (shown in FIG. 1). Mounting plate 801 comprises a body 803 defining a recess or bore 805 for accepting jaws 105 (shown in FIG. 1) of chuck 101. Mounting plate 801 further comprises a first mounting plate locator 807, a second mounting plate locator 809, and a third mounting plate locator 811. Generally, mounting plate locators 807, 809, and 811 are spatially disposed and adapted to interface or mate with chuck locators 107, 109, and 111 (shown in FIG. 1), respectively, of chuck 101. In the illustrated embodiment, first mounting plate locator 807, second mounting plate locator 809, and third mounting plate locator 811 of mounting plate 801 define faying surfaces 903, 905, and 907, respectively. Faying surfaces 903, 905, and 907 exhibit a predetermined relationship to a rotational axis 909 of mounting plate 801. Preferably, faying surfaces 903, 905, and 907 are substantially coplanar with one another and are substantially perpendicular to rotational axis 909. Faying surfaces 903, 905, and 907 of mounting plate 801 abut faying surfaces 201, 203, and 301 (shown in FIGS. 2 and 3) of chuck 101.

Still referring to FIGS. 8 and 9, the plurality of mounting plate locators 807, 809, and 811 have a spatial configuration that corresponds to the spatial configuration of the plurality of chuck locators 107, 109, and 111. To correspond with the particular, illustrative spatial configuration of chuck locators 107, 109, and 111 of FIG. 1, first mounting plate locator 807 is angularly spaced from second mounting plate locator 809 by an angle A, second mounting plate locator 809 is angularly spaced from third mounting plate locator 811 by an angle B, and third mounting plate locator 811 is angularly spaced from first mounting plate locator 807 by an angle C. Moreover, mounting plate locators 807, 809, and 811 are spaced away from rotational axis 909 of mounting plate 801 by distances corresponding to the distances that chuck locators 107, 109, and 111, respectively, are spaced away from rotational axis 205 (shown in FIG. 2) of chuck 101.

FIG. 10 depicts an enlarged view of a preferred embodiment of mounting plate locators 807, 809, and 811. In this embodiment, mounting plate locators 807, 809, and 811 are headed pins made from hardened steel, carbide, or the like. Each of mounting plate locators 807, 809, and 811 defines a right cylindrical pin 1001 extending from faying surface 903, 905, or 907 that is configured to be received in bore 401 of first chuck locator 107, bore 501 of second chuck locator 109, and bore 601 of third chuck locator 111, respectively, of chuck 101. Note that bores 401, 501, and 601 are best shown in FIGS. 4, 5, and 6, respectively. As noted above, faying surfaces 903, 905, and 907 of mounting plate 801 abut faying surfaces 201, 203, and 301 (shown in FIGS. 2 and 3) of chuck 101.

Figure 11:
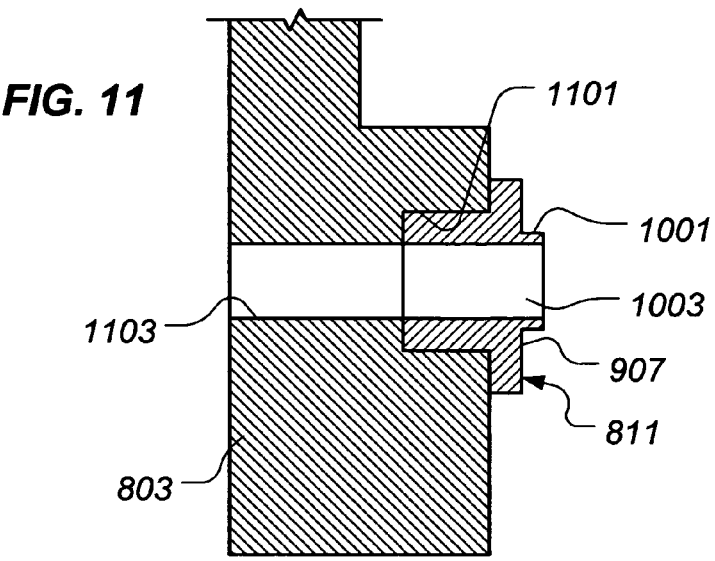
FIG. 11 is a cross-sectional view of a portion of the mounting plate of FIG. 8, taken along the line 11-11 in FIG. 8.

FIG. 11 depicts a cross-sectional view, taken along the line 11-11 of FIG. 8, of a portion of mounting plate 801 including third mounting plate locator 811. Third mounting plate locator 811 is disposed in a bore 1101 defined by body 803 of mounting plate 801. Preferably, third mounting plate locator 811 is engaged with body 803 by a press-fit. Alternatively, third mounting plate locator 811 may be attached to body 803 within bore 1101 by any suitable means, such as by adhesive bonding. First mounting plate locator 807 and second mounting plate locator 809 are also disposed in bores, corresponding to bore 1101, defined by body 803 in a similar manner as third mounting plate locator 811.

Still referring to FIG. 11, body 803 further defines a fastener opening 1103 to accept a fastener, as will be discussed in greater detail herein. Body 803 also defines fastener openings, corresponding to fastener opening 1103, which are adjacent to bores in which mounting plate locators 807 and 809 are disposed. Referring also to FIG. 10, mounting plate locators 807, 809, and 811 each further define a fastener opening 1003, through which fasteners may be disposed for engagement with the fastener openings defined by body 103, such as fastener opening 703.

Figure 12:
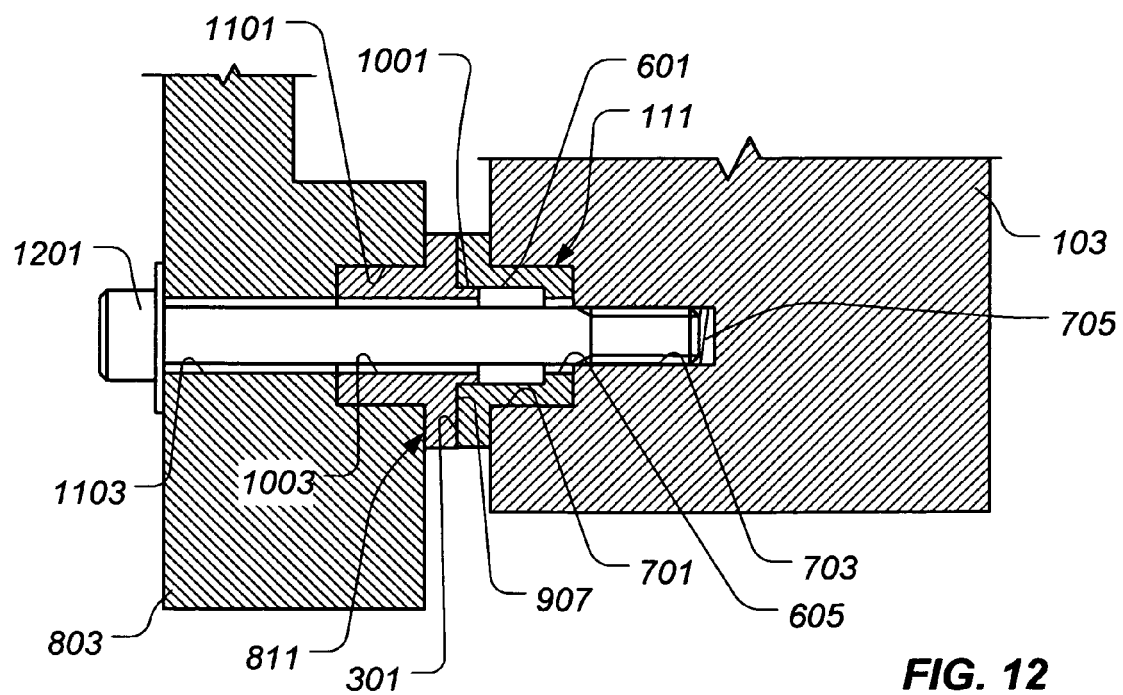
FIG. 12 is a cross-sectional view of the portion, illustrated in FIG. 7, of the chuck of FIG. 1 mated with the portion, illustrated in FIG. 11, of the mounting plate of FIG. 8.

FIG. 12 illustrates third mounting plate locator 811 of mounting plate 801 mated with third chuck locator 111 of chuck 101. Preferably, pin 1001 of third mounting plate locator 811 has a sliding fit with relation to bore 601 of third chuck locator 111. A fastener 1201 is disposed through fastener opening 1103 of body 803 of mounting plate 801, through fastener opening 1003 of third mounting plate locator 811 of mounting plate 801, through fastener opening 605 of third chuck locator 111 of chuck 101, and into fastener opening 703 of body 103 of chuck 101. In the preferred, illustrated embodiment, fastener 1201 is a threaded fastener that threadedly engages threads 705 of body 103 of chuck 101. Fasteners, such as fastener 1201, are also disposed through body 803 of mounting plate 801, through mounting plate locators 807 and 809 of mounting plate 801, through chuck locators 107 and 109 of chuck 101, and into body 103 of chuck 101 in a fashion corresponding to the configuration illustrated in FIG. 12 for fastener 1201.

Figure 13:
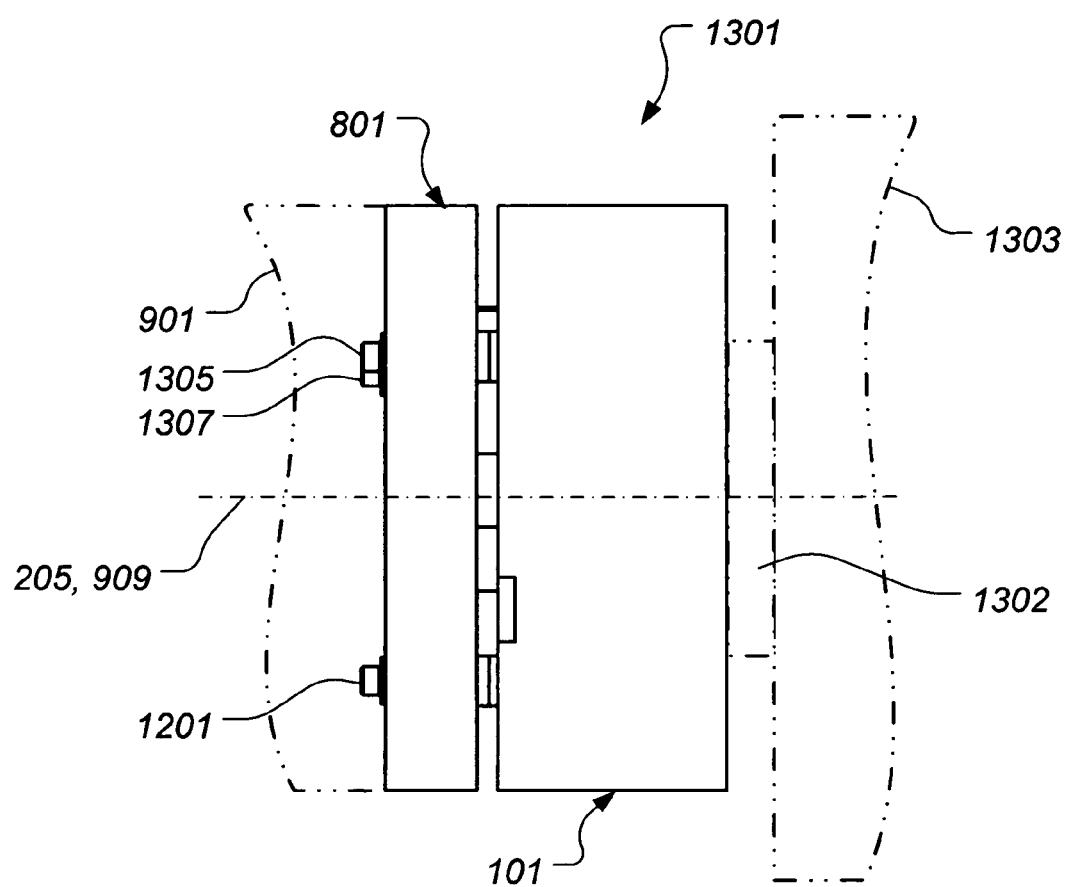
FIG. 13 is a side, elevational view of an apparatus according to the present invention for adapting a workpiece holding device to a machine tool.

FIG. 13 depicts mounting plate 801 mated and attached to chuck 101 to form an apparatus 1301 for mounting a workpiece holding device, such as workpiece holding device 901 (shown in FIG. 9), to a spindle 1302 (shown in phantom) of a machine tool 1303 (shown in phantom), such as a lathe, a turning center, a milling/turning center, or the like. Pin 1001 (shown in FIG. 10) of first mounting plate locator 807 of mounting plate 801 is disposed in bore 401 (shown in FIG. 4) of first chuck locator 107 of chuck 101. Pin 1001 of second mounting plate locator 809 of mounting plate 801 is disposed in bore 501 (shown in FIG. 5) of second chuck locator 109 of chuck 101. Pin 1001 of third mounting plate locator 811 of mounting plate 801 is disposed in bore 601 (shown in FIG. 6) of third chuck locator 111 of chuck 101. Faying surfaces 201, 203, and 301 (shown in FIGS. 2 and 3) of chuck locators 107, 109, and 111, respectively, abut faying surfaces 903, 905, and 907 (shown in FIG. 9) of mounting plate locators 807, 809, and 811, respectively. Fasteners 1201, 1305, and 1307 affix mounting plate 801 to chuck 101 through third chuck and mounting plate locators 111 and 811, first chuck and mounting plate locators 107 and 807, and second chuck and mounting plate locators 109 and 809, respectively. Other fastener configurations, however, are within the scope of the present invention.

Note that, in a preferred embodiment, right cylindrical pin 1001 of first mounting plate locator 807 of mounting plate 801 is disposed in right cylindrical bore 401 of first chuck locator 107 of chuck 101. Right cylindrical pin 1001 of second mounting plate locator 809 of mounting plate 801 is disposed in oblong cylindrical bore 501 of second chuck locator 109 of chuck 101. Right cylindrical pin 1001 of third mounting plate locator 811 of mounting plate 801 is disposed in oblong cylindrical bore 601 of third chuck locator 111 of chuck 101. Pins 1001 of second mounting plate locator 809 and third mounting plate locator 811 are sized to allow pins 1001 to move within bore 501 of second chuck locator 109 and within bore 601 of third chuck locator 111 in a direction substantially along longitudinal axes 503 and 603 of bores 501 and 601, respectively. In this way, compensation is provided for accumulated tolerances in the manufacture of mounting plate 801 and chuck 101. Pins 1001 of second mounting plate locator 809 and third mounting plate locator 811, however, are restricted by from moving within bores 501 and 601 in directions substantially perpendicular to longitudinal axes 503 and 603 of bores 501 and 601, respectively.

While chuck locators 107, 109, and 111 are illustrated herein as being configured to receive pins 1001 of mounting plate locators 807, 809, and 811, respectively, the scope of the present invention is not so limited. Rather, the present invention contemplates an embodiment wherein one or more of chuck locators 107, 109, and 111 are attached to body 803 of mounting plate 801 and a corresponding one or more of mounting plate locators 807, 809, and 811 are attached to body 103 of chuck 101, such that chuck locators 107, 109, and 111 interface with mounting plate locators 807, 809, and 811, respectively.

As discussed above, the scope of the present invention encompasses an apparatus 1301 for mounting a workpiece holding device, such as workpiece holding device 901 (shown in FIG. 9), to a machine tool, such as a lathe, a turning center, a milling/turning center, or the like. The scope of the present invention also encompasses an apparatus for adapting a chuck to accept a workpiece holding device. This apparatus comprises, in a preferred embodiment, chuck locators 107, 109, and 111 that are configured for attachment to a body of a chuck, such as body 103 of chuck 101, and mounting plate 801. Thus, in one embodiment of the present invention, a chuck is originally manufactured to include the chuck locators, such as chuck locators 107, 109, and 111. In an alternative embodiment, an existing chuck is modified to include the chuck locators, such as chuck locators 107, 109, and 111.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. An apparatus for adapting a workpiece holding device to a chuck of a machine tool, the apparatus comprising:
    a plurality of at least three chuck locators configured for attachment to the chuck; and
    a mounting plate configured for attachment to the workpiece holding device, the mounting plate comprising:
        a body; and
        a plurality of mounting plate locators corresponding to the plurality of chuck locators, such that the plurality of mounting plate locators are attached to the body and are configured to interface with the plurality of chuck locators;
    wherein one of the plurality of chuck locators defines a substantially round cylindrical opening, at least two of the plurality of chuck locators define oblong cylindrical openings, and the plurality of mounting plate locators defines a plurality of pins configured to be received in the plurality of chuck locators; or
    one of the plurality of mounting plate locators defines a substantially round cylindrical opening, at least two of the plurality of mounting plate locators define oblong cylindrical openings, and the plurality of chuck locators defines a plurality of pins configured to be received in the plurality of chuck locators.

2. An apparatus, according to claim 1, wherein the plurality of chuck locators defines a plurality of faying surfaces and the plurality of mounting plate locators defines a plurality of faying surfaces, such that the plurality of faying surfaces defined by the plurality of chuck locators is configured to abut the plurality of faying surfaces defined by the plurality of mounting plate locators.

3. An apparatus, according to claim 1, further comprising:
    a plurality of fasteners for attaching the mounting plate to the chuck.

4. An apparatus, according to claim 3, wherein:
    the plurality of fasteners corresponds to the plurality of chuck locators;

the plurality of chuck locators defines a plurality of fastener openings configured to receive the plurality of fasteners; and the plurality of mounting plate locators defines a plurality of fastener openings configured to receive the plurality of fasteners.

5. An apparatus for adapting a workpiece holding device to a machine tool, the apparatus comprising:
a chuck including a plurality of moveable jaws;
a plurality of at least three chuck locators attached to the chuck; and
a mounting plate configured for attachment to the workpiece holding device, the mounting plate comprising:
a body; and
a plurality of mounting plate locators corresponding to the plurality of chuck locators, such that the plurality of mounting plate locators are attached to the body and are configured to interface with the plurality of chuck locators, and
a plurality of fasteners attaching the mounting plate to the chuck.

6. An apparatus, according to claim 5, wherein the plurality of chuck locators defines a plurality of faying surfaces and the plurality of mounting plate locators defines a plurality of faying surfaces, such that the plurality of faying surfaces defined by the plurality of chuck locators abuts the plurality of faying surfaces defined by the plurality of mounting plate locators.

7. An apparatus, according to claim 5 wherein the chuck has a rotational axis and each of the plurality of chuck locators are spaced away from the rotational axis by different distances.

8. An apparatus, according to claim 5, wherein:
the plurality of fasteners corresponds to the plurality of chuck locators;
the plurality of chuck locators defines a plurality of fastener openings through which the plurality of fasteners is received; and
the plurality of mounting plate locators defines a plurality of fastener openings through which the plurality of fasteners is received.

9. An apparatus, according to claim 5, wherein the plurality of mounting plate locators defines a plurality of pins received in the plurality of chuck locators.

10. An apparatus, according to claim 9, wherein one of the plurality of chuck locators defines a substantially round cylindrical opening in which one of the plurality of pins of the plurality of mounting plate locators is received.

11. An apparatus, according to claim 10, wherein at least two of the plurality of chuck locators define oblong cylindrical openings in which a corresponding at least two of the plurality of mounting plate locators is received.

12. An apparatus, according to claim 5, wherein the plurality of chuck locators defines a plurality of pins received in the plurality of mounting plate locators.

13. An apparatus, according to claim 12, wherein one of the plurality of mounting plate locators defines a substantially round cylindrical opening in which one of the plurality of pins of the plurality of chuck locators is received.

14. An apparatus, according to claim 13, wherein at least two of the plurality of mounting plate locators define oblong cylindrical openings in which a corresponding at least two of the plurality of chuck locators is received.

15. An apparatus for adapting a workpiece holding device to a machine tool, the apparatus comprising:
a chuck defining a plurality of at least three bores and a plurality of fastener openings, such that one of the plurality of fastener openings extends from each of the plurality of bores;
a chuck locator attached to the chuck in each of the plurality of bores defined by the chuck, each of the chuck locators defining a faying surface and fastener opening;
a mounting plate configured for attachment to the workpiece holding device, the mounting plate comprising:
a body defining a plurality of bores corresponding to the plurality of bores defined by the chuck and a plurality of fastener openings, such that one of the plurality of fastener openings extends from each of the plurality of bores defined by the body; and
a mounting plate locator attached to the mounting plate in each of the plurality of bores defined by the body of the mounting plate, each of the mounting plate locators defining a faying surface abutting one of the faying surfaces of the chuck locators and a fastener opening, such that the mounting plate is spaced away from the chuck by the chuck locators and the mounting plate locators; and
a plurality of fasteners corresponding to the plurality of fastener openings of defined by the chuck, the plurality of fasteners extending through the plurality of fastener openings defined by the body of the mounting plate, extending through the fastener openings defined by the mounting plate locators, extending through the fastener openings defined by the chuck locators, and extending into the plurality of fastener openings defined by the chuck, such that the fasteners are engaged with the chuck.

16. An apparatus for adapting a workpiece holding device to a machine tool, the apparatus comprising:
a chuck;
a plurality of at least three chuck locators attached to the chuck; and
a mounting plate configured for attachment to the workpiece holding device, the mounting plate comprising:
a body; and
a plurality of mounting plate locators corresponding to the plurality of chuck locators, such that the plurality of mounting plate locators are attached to the body and are configured to interface with the plurality of chuck locators;
wherein one of the plurality of chuck locators defines a substantially round cylindrical opening, at least two of the plurality of chuck locators define oblong cylindrical openings, and the plurality of mounting plate locators defines a plurality of pins configured to be received in the plurality of chuck locators; or
one of the plurality of mounting plate locators defines a substantially round cylindrical opening, at least two of the plurality of mounting plate locators define oblong cylindrical openings, and the plurality of chuck locators defines a plurality of pins configured to be received in the plurality of chuck locators.

17. An apparatus, according to claim 16, wherein the plurality of chuck locators defines a plurality of faying surfaces and the plurality of mounting plate locators defines a plurality of faying surfaces, such that the plurality of faying surfaces defined by the plurality of chuck locators abuts the plurality of faying surfaces defined by the plurality of mounting plate locators.

18. An apparatus, according to claim 16, further comprising:

a plurality of fasteners attaching the mounting plate to the chuck.

19. An apparatus, according to claim 18, wherein:
the plurality of fasteners corresponds to the plurality of chuck locators;
the plurality of chuck locators defines a plurality of fastener openings through which the plurality of fasteners is received; and
the plurality of mounting plate locators defines a plurality of fastener openings through which the plurality of fasteners is received.

20. An apparatus, according to claim 16, wherein the chuck includes a plurality of moveable jaws.

* * * * *